UNITED STATES PATENT OFFICE.

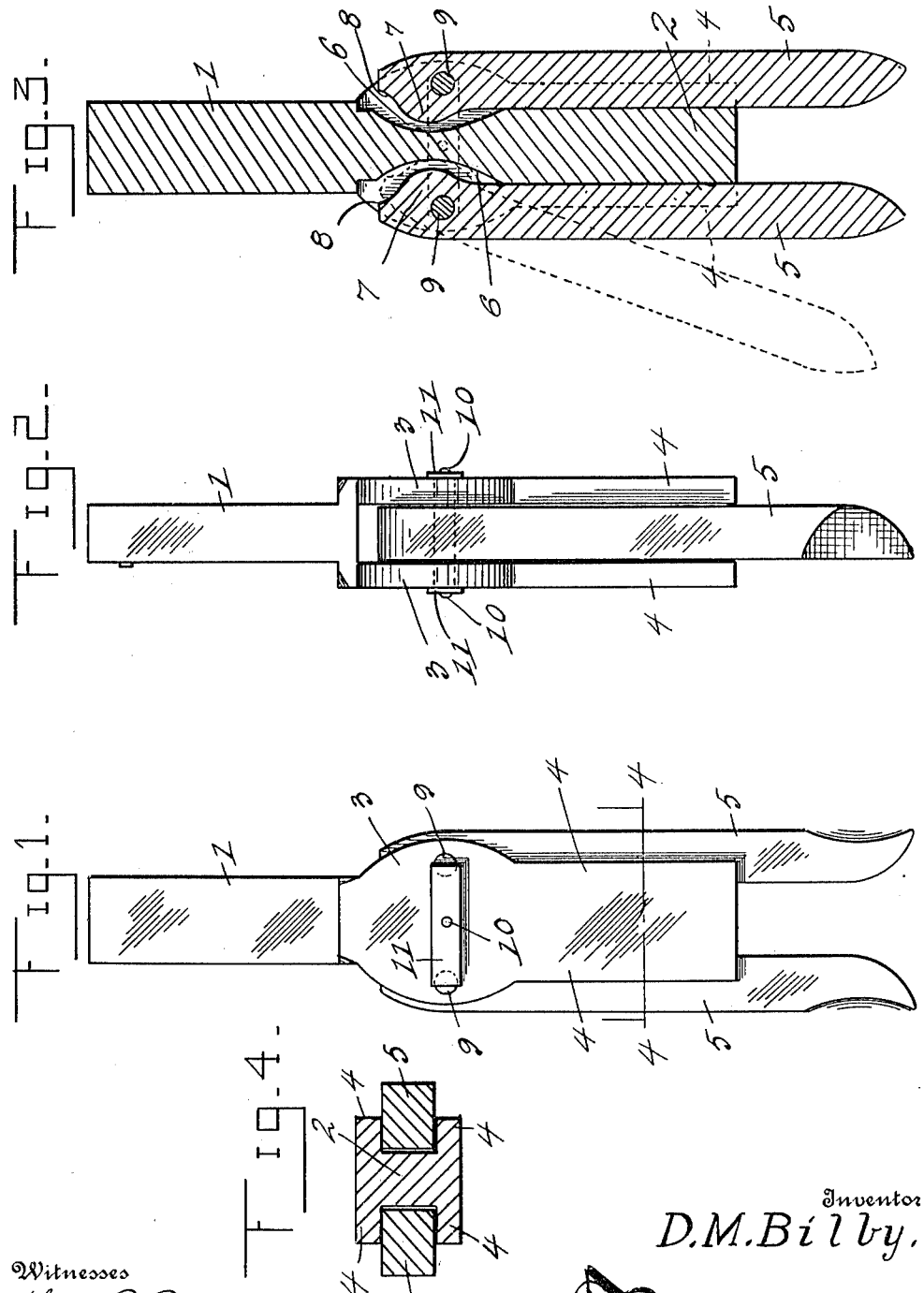

DANIEL M. BILBY, OF SHARON, PENNSYLVANIA.

TOOL-HOLDER.

1,074,041.　　　　Specification of Letters Patent.　　Patented Sept. 23, 1913.

Application filed February 18, 1913. Serial No. 749,254.

*To all whom it may concern:*

Be it known that I, DANIEL M. BILBY, a citizen of the United States, residing at Sharon, in the county of Mercer and State of Pennsylvania, have invented certain new and useful Improvements in Tool-Holders; and I do hereby declare the following to be a full, clear, and exact description of the invention, such as will enable others skilled in the art to which it appertains to make and use the same.

This invention relates to shaper tool holders and one of the principal objects of the invention is to provide simple, reliable and efficient means for holding a pair of tools to a shank and to permit ready detachment of the tools without requiring the withdrawal of bolts or screws.

Another object of the invention is to provide a compound shaper tool holder in which the shank is provided with registering holes for plain unthreaded pins and in which pivoted turn buttons are utilized for holding the pins in place, said pins extending through the ends of the tools for pivoting them to the tool holder.

These and other objects may be attained by means of the construction illustrated in the accompanying drawing, in which:—

Figure 1 is a side elevation of a tool holder made in accordance with my invention; Fig. 2 is an edge view of the same; Fig. 3 is a central longitudinal section showing in dotted lines one of the positions which may be assumed by one of the tools; Fig. 4 is a sectional view on the line 4—4 of Fig. 1 looking in the direction indicated by the arrow.

Referring to the drawing, the numeral 1 designates the shank of the tool holder adapted to be secured to the shaper machine in any suitable way. Extending from the shank is a centrally disposed integral stop or bearing portion 2 against which the sides of the tools rest when in operative position. Extending outward from the portion 2 are the side members 3 of the tool holder and extending from the side members 3 are the side flanges 4, said flanges being spaced apart to admit the tools 5 between them on opposite sides of the stop member 2. The opposite sides of the tool holder between the members 3 are recessed as at 6 to accommodate the curved and enlarged head portions 7 of the tools. Formed on the head portions 7 is a stop member 8. The perforations in the enlarged members 7 of the tools are in alinement with perforations through the members 3 of the tool holder and these perforations are plain and unthreaded. Fitted in the perforations in the members 3 and extending through the perforations in the enlarged portions 7 of the tools are plain round pins 9, the ends of said pins being substantially flush with the outer surfaces of the members 3. Pivoted at 10 to the members 3 are button plates 11 which extend over the ends of the pins 9 for holding them in place.

When it is desired to remove the tools for the substitution of others for different purposes or for forming grooves of different formation, the buttons 11 are swung upon their pivotal points 10 and the pins 9 are removed. Tools of other form may be quickly connected to the tool holder and the pins 9 replaced after which the buttons 11 are swung to a horizontal position to prevent the withdrawal of the pins.

From the foregoing, it will be obvious that my tool holder is simple in construction, does not require screw threading and is quick and easy to use in permitting the interchange of tools of various forms and for various purposes.

I claim:

1. A tool holder comprising a body portion having longitudinal recesses extending from one terminal thereof upon opposite sides to a point approximately centrally of the ends of said body portion and terminating in enlarged recesses, and said body portion adapted to have tools mounted within said recesses.

2. A tool holder comprising a body portion having longitudinal recesses upon opposite sides thereof and extending from one terminal of said body portion to a point approximately centrally of the ends thereof, and terminating in enlarged recesses, said body portion adapted to have tools mounted within said recesses, the inner terminal of said body portion comprising a shank and the outer terminal extending to a point approximately centrally of the ends of said tools and adapted to space them.

3. A tool holder comprising a body portion having longitudinal recesses upon opposite sides extending from the outer terminal of said body portion to a point approximately centrally of the ends of said body portion and terminating in enlarged recesses, tools pivotally mounted within the enlarged recesses and adapted to engage the recesses upon the outer terminal of said body portion, and means formed on said tools adapted to coöperate with said enlarged recesses to limit the outward movement of said tools with relation to said body portion.

In testimony whereof I affix my signature in presence of two witnesses.

DANIEL M. BILBY.

Witnesses:
ANDREW J. STORM,
THOMAS MORTON.